March 13, 1951     J. CORYDON, II     2,545,263

SOFT TUBING CONNECTOR

Filed April 3, 1946

INVENTOR.

Jeff Corydon II

BY Nathaniel Frucht

Attorney

Patented Mar. 13, 1951

2,545,263

UNITED STATES PATENT OFFICE 2,545,263

SOFT TUBING CONNECTOR

Jeff Corydon, II, Cranston, R. I., assignor to Morse Boulger Destructor Company, a corporation of Delaware Application April 3, 1946, Serial No. 659,181

2 Claims. (Cl. 285—86)

The present invention relates to couplings for tubing, and has particular reference to a novel connector for soft tubing.

The principal object of the invention is to provide an improved connector for soft tubing of the plastic hose type.

Another object of the invention is to provide an improved connector for soft tubing which bonds the tubing tightly in the connector.

An additional object is to provide connector parts which cause the tubing to form a fluid-tight seal in the connector.

Still another object of the invention is to provide parts for a threaded connector for soft tubing which spreads the tubing end to seal the connecting threads.

With the above and other objects and advantageous features in view, the invention consists of a novel arrangement of parts more fully disclosed in the detailed description following, in conjunction with the accompanying drawings, and more specifically defined in the appended claims.

Figure 1:
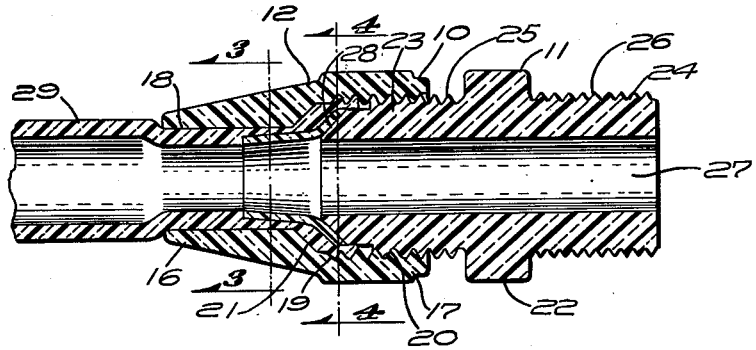
Fig. 1 is a partial vertical section through the novel connector, showing the parts in connected relation.

It has been found desirable to provide a simple and effective connector for soft plastic tubing, which utilizes standard type connector parts and bonds the tubing end tightly in the connector to form a fluid tight seal. To this end, I position a soft tubing to seat within the body of a threaded coupling, and place a flared spreader made preferably of relatively hard plastic within the open end of the tubing. I then thread the connector nut into the body to press the flared spreader against the body seat and spread the tubing end against the body seat and into the connector threads, whereby a fluid tight seal results.

Referring to the drawings, the novel connector 10 utilizes a standard type coupling body 11 and a standard type coupling nut 12, together with a novel spreader having a non-metallic plastic hollow body 13 formed with a cylindrical portion 14 at its lower end and a flared conical portion 15 at its upper end. The coupling body 11 is provided with a tapered end 16 and a nut receiving hub end 17, and is bored to provide a cylindrical flow passage 18 at the tapered end, an annular enlarged recess 19 at the other end, the recess being provided with threads 20 and an intermediate conical seat 21. The coupling nut 12 has a central knurled or flat sided portion 22, and two ends 23, 24 which have exterior threads 25, 26, the nut having a central cylindrical flow passageway 27; the coupling end 23 is formed with a conical end 28 adapted to cooperate with the coupling body seat 21.

Figure 2:
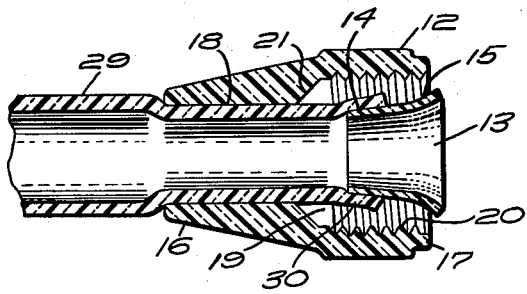
Fig. 2 is a view of the body of the connector with the parts and the tubing connected for assembly.
Figure 3:
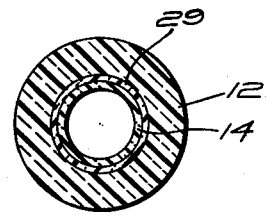
Fig. 3 is a section on the line 3—3 of Fig. 1.
Figure 4:
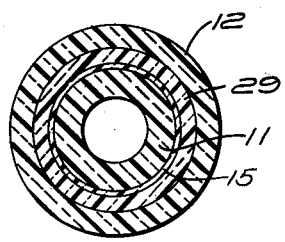
Fig. 4 is a section on the line 4—4 of Fig. 1.
Figure 5:
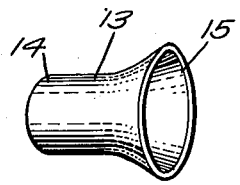
Fig. 5 is a perspective view of the novel spreader for spreading the tubing end.

As illustrated in Fig. 2, a soft plastic tubing or hose 29 is positioned in the flow passage of the coupling body 12 with its end 30 in the recess 20. The spreader 13 is inserted into the tubing end 30, and the coupling end 23 of the nut 11 is then threaded into the recess 20, thus forcing the spreader 13 and the tubing end 30 inwardly. The outer flared surface of the spreader 13 spreads the tubing end 30 against the conical seat 21; since the cylindrical portion 14 of the spreader presses into the passage 18, the tubing end 30 is forced laterally and squeezed up into the threads 19 to form a plastic seal around the conical end 28 of the coupling nut. The nut end 24 is then threaded into a cooperating fluid housing or casing part, not shown.

The non-metallic material of spreader 13 prevents cutting or damaging the tubing end, and provides a slightly yielding seat for the conical end of the coupling nut, the nut and the coupling body being preferably of hard plastic.

The above described connector construction is particularly suitable for tubing made of soft vinylite or similar plastic, but may be used with any yieldable or elastic tubing, such as latex tubing or the like. It provides a fluid-tight seal which is particularly advantageous for tubing which is exposed to extreme variations in temperature or which is subjected to fluid pressure, and is of especial advantage for chemical flow control systems, as a wide range of chemically resistant plastics is available.

Figure 6:
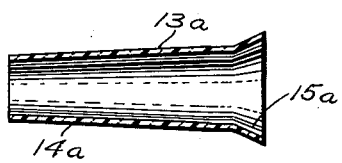
Fig. 6 is a longitudinal section through a modified construction of spreader.

A modified construction of flared spreader is preferable for use with tubing connected to chemical treatment systems in which the chemical fluid may attack plastic material. Since the soft tubing for such systems is preferably transparent, it is desirable to increase the length of the spreader, as illustrated in Fig. 6, the modified spreader 13a having a longer cylindrical portion 14a and a flared upper end 15a, whereby the end of the cylindrical portion 14a projects beyond the tapered end 16 of the coupling body. If the chemical fluid does attack the plastic material of which the spreader is made, such attack becomes visible at the spreader end through the transparent tubing, and the spreader can be readily replaced before the fluid seal is broken.

While I have described a specific connector construction of the half union type, it is obvious that the connector may be of the full union type, and that the size, shape, and design of the parts, and their material, may be changed to suit the requirements for different couplings and their intended uses, without departing from the spirit and the scope of the invention as defined in the appended claims.

I claim:

1. A connector for soft tubing, comprising a coupling body having a flow passage, a threaded recess of larger diameter than the flow passage, and a tubing seat positioned between the flow passage and the threaded recess, whereby a tubing end may be inserted through the flow passage to extend into the recess, a spreader having a cylindrical lower portion adapted to be inserted in the tubing end and a flaring upper portion extending into the recess, and a coupling nut having a flow passage and externally threaded to be screwed into the recess and having an end portion engageable with the flaring upper portion of the spreader to force the spreader into the body flow passage and the tubing end against the body tubing seat.

2. A connector for soft tubing, comprising a coupling body having a flow passage, a threaded recess of larger diameter than the flow passage, and a tapered tubing seat positioned between the flow passage and the threaded recess, whereby a tubing end may be inserted through the flow passage to extend into the recess, a spreader having a cylindrical lower portion adapted to be inserted in the tubing end and a flaring upper portion extending into the recess, and a coupling nut having a flow passage and externally threaded to be screwed into the recess and having a tapered end portion engageable with the flaring upper portion of the spreader to force the spreader into the body flow passage and the tubing end against the body tubing seat.

JEFF CORYDON, II.

REFERENCES CITED

The following references are of record in the file of this patent:

UNITED STATES PATENTS

| Number | Name | Date |
|---|---|---|
| 756,350 | Garbutt | Apr. 5, 1904 |
| 2,000,481 | Harrison | May 7, 1935 |
| 2,267,416 | Neukirch | Dec. 23, 1941 |
| 2,424,727 | Wenk | July 29, 1947 |